(12) United States Patent
Murayama et al.

(10) Patent No.: US 8,131,154 B2
(45) Date of Patent: Mar. 6, 2012

(54) VISIBLE LIGHT COMMUNICATION APPARATUS

(75) Inventors: Fumitaka Murayama, Nagoya (JP);
Hiroyuki Kurokawa, Tokyo (JP);
Naoyuki Furuta, Tokyo (JP)

(73) Assignee: Planners Land Co., Ltd., Nagoya-shi (JP)

( * ) Notice: Subject to any disclaimer, the term of this patent is extended or adjusted under 35 U.S.C. 154(b) by 376 days.

(21) Appl. No.: 12/412,515

(22) Filed: Mar. 27, 2009

(65) Prior Publication Data

US 2009/0245806 A1 Oct. 1, 2009

(30) Foreign Application Priority Data

Mar. 28, 2008 (JP) .................. P2008-86115

(51) Int. Cl.
*H04B 10/00* (2006.01)
(52) U.S. Cl. ........ 398/130; 398/127; 398/118; 398/140; 398/172
(58) Field of Classification Search .................. 398/130, 398/127, 118, 140, 172
See application file for complete search history.

(56) References Cited

U.S. PATENT DOCUMENTS

| | | |
|---|---|---|
| 2002/0167701 A1 | 11/2002 | Hirata |
| 2006/0239689 A1* | 10/2006 | Ashdown ..................... 398/130 |
| 2007/0147032 A1 | 6/2007 | Furukawa et al. |
| 2009/0214225 A1* | 8/2009 | Nakagawa et al. ........... 398/191 |

FOREIGN PATENT DOCUMENTS

| | | |
|---|---|---|
| EP | 1 855 398 A1 | 11/2007 |
| EP | 1865564 A1 | 12/2007 |
| EP | 2091162 A1 | 8/2009 |
| JP | 2004048333 A * | 2/2004 |
| JP | 2007-266794 A | 10/2007 |
| WO | 2006/123697 A1 | 11/2006 |

OTHER PUBLICATIONS

European Search Report dated May 8, 2009, issued in corresponding European Patent Application No. 09004280.5.
European Office Action date Sep. 7, 2011, issued in corresponding European patent Applicatiion No. 09004280.5.

* cited by examiner

*Primary Examiner* — Kinam Park
(74) *Attorney, Agent, or Firm* — Westerman, Hattori, Daniels & Adrian, LLP (57) ABSTRACT

A visible light communication apparatus is constituted with a transmitter for illuminating and projecting visible light on which an information signal is superimposed from a lamp fitting and a receiver for receiving the visible light to take out the information signal superimposed on the visible light. The transmitter modulates a transmission information signal, driving a light projecting element of the lamp fitting so as to superimpose the transmission information signal on the visible light of the lamp fitting, thereby radiating white light containing a blue light component as visible illumination light. The receiver receives the white visible light containing the blue light component radiated from the transmitter and generates a receiving information signal from the light receiving signal on a receiving circuit. A blue light photodiode which receives blue light at the highest sensitivity to output a light receiving signal is used as a light receiving element of the light receiving unit. The lamp fitting for radiating the white light containing the blue light component on the side of the transmitter as visible illumination light and the blue light photodiode for receiving blue light on the side of the receiver at the highest sensitivity can be used to perform visible light communications at high speed, while illuminating by the white light.

6 Claims, 5 Drawing Sheets

VISIBLE LIGHT COMMUNICATION APPARATUS

BACKGROUND OF THE INVENTION

1. Field of the Invention

The present invention relates to a visible light communication apparatus for performing communications by using visible light radiated in a space and in particular to the visible light communication apparatus capable of performing communications at high speed by means of a relatively simplified circuit.

2. Description of Related Art

Wireless communications by using radio waves as a communication medium have found many uses in various fields such as cellular phone networks, wireless LANs and short-distance wireless communications.

However, in wireless communications in which radio waves are used as a medium, it is impossible to increase the transmission power, with the influence of electromagnetic waves on the human body taken into account, where the transmitting and receiving are performed near people. Further, since the frequency range of radio waves used in wireless communications has already been allocated in many areas and actually used, it is impossible to use freely frequencies over a wide range. Still further, under special circumstances such as medical institutions, there are some restrictions, for example, the limited use of radio waves.

Thus, in recent years, there has been developed visible light communications in which visible light is used as a communication medium, and a visible light communication system has been proposed in Japanese Published Patent Application No. 2007-266794 A.

In the above-described conventional visible light communication system, visible light is used as illumination light to perform visible light communications, thereby transmitting and receiving information by using white light which is of a daylight color and free of sense of discomfort as illumination light. Therefore, an LED for projecting white light (white light emitting diode) is used as a light projecting element on the side of a transmitter, while a light receiving element for receiving white light to output a light receiving signal is used as a light receiving unit on the side of a receiver.

However, in most cases, an LED which projects white light uses a fluorescent body to generate light, the color of which is complementary to a luminescent color of the LED in order to synthesize the white light thereof. However, due to the lower responsiveness of the fluorescent body, a high frequency signal to be superimposed on the white light is kept low in frequency. Further, the light receiving element for receiving the white light is difficult to operate at high speed on receiving of visible light on which the high frequency signal is superimposed, by which communication speed has been suppressed. For this reason, a conventional visible light communication apparatus has a problem that, for example, where audio signals or image signals great in the amount of digitalized information are superimposed on visible light to transmit or receive them, the communication speed is slow, thus making it difficult to transmit and receive good-quality audio information or good-quality image information.

SUMMARY OF THE INVENTION

An object of the present invention is to provide a visible light communication apparatus capable of performing communications at high speed by means of visible light and being constituted together with a transmitter and a receiver by using a simplified circuit.

An object of the present invention is accomplished by a visible light communication apparatus which is constituted as below. Specifically, the visible light communication apparatus is provided with a transmitter for illuminating and projecting visible light on which an information signal is superimposed, and a receiver for receiving the visible light illuminated and projected from the transmitter to take out the information signal superimposed on the visible light, in which the transmitter is provided with a modulation circuit for modulating a signal to generate a transmission information signal, and a lamp fitting for driving a light projecting element to superimpose the transmission information signal on the visible light, thereby radiating white light containing a blue light component as visible illumination light, and the receiver is provided with a light receiving unit for receiving white light containing the blue light component radiated from the lamp fitting of the transmitter and a receiving circuit for generating a receiving information signal from the light receiving signal output from the light receiving unit, and a blue light photodiode which receives blue light at the highest sensitivity to output a light receiving signal is used as a light receiving element of the light receiving unit.

In this instance, the blue light is a concept which includes not only pure blue light but also blue purple light relatively short in wavelength and blue green light relatively long in wavelength. Further, the blue light is a concept which includes blue laser light, and a photodiode for blue laser light may be therefore used.

According to the visible light communication apparatus of the present invention, white light containing a blue light component is illuminated and projected from a lamp fitting of a transmitter, and on the side of a light receiving unit, the white light is received by a light receiving element which is a blue light photodiode for receiving blue light at the highest sensitivity. In this instance, the light receiving element of the light receiving unit receives the blue light component of the thus radiated white light at high sensitivity and also receives it so as to respond at high speed. Therefore, where visible light (white light) on which a high-speed information signal is superimposed is illuminated and projected from the transmitter, the light receiving element of the light receiving unit receives the high-speed information signal, and a receiving circuit is able to generate the receiving information signal.

Further, since the lamp fitting will radiate white light containing a blue light component but will not radiate blue light exclusively, it is possible to perform visible light communications at high speed, while keeping its function as an ordinary lighting device. Specifically, the lamp fitting radiates white light and can be therefore used without any sense of discomfort as a lighting device, thus making it possible to perform visible light communications at high speed and provide lighting at the same time.

In this instance, the above-described modulation circuit may be given as a PWM (Pulse Width Modulation) circuit for treating a signal by PWM.

Further, the lamp fitting of the transmitter may be constituted in such a manner as to have a white light emitting diode for illuminating and projecting white light containing a blue light component and a second driving circuit for driving the white light emitting diode by connecting a resistor between a cathode of the white light emitting diode and the ground so as to flow a power electric current of the white light emitting diode directly to the resistor, in which a first driving circuit is connected to the input side of the second driving circuit, and an amplifier circuit for amplifying a modulation signal treated by PWM is installed on the first driving circuit, thereby applying a transmission signal output from the first driving circuit to both ends of the resistor of the second driving circuit.

According to the present invention, the power electric current flowing to the white light emitting diode acting as a lamp fitting on the second driving circuit of the transmitter directly flows to the resistor connected between the cathode of the white light emitting diode and the ground, and the transmission signal output from the first driving circuit is applied to both ends of the resistor to illuminate and drive the white light emitting diode.

Conventionally, an LED driving circuit ordinarily used in a transmitter of visible light communications needs a high-output element as a switching element due to the fact that the electric current of an LED is allowed to flow directly to the switching element such as an FET (Field Effect Transistor), and a high-output element capable of operating at high speed is in reality higher in price and restricted in selection.

However, in the present invention, the electric current of a white light emitting diode is allowed to flow to a resistor, thereby, a resistor is changed in value of resistance to adjust the electric current whenever necessary, thus making it possible to adjust the modulation percentage of an information signal to be superimposed on visible light arbitrarily, that is, shallowly or deeply. For example, where the electric current flowing to the resistor is reduced to make the modulation percentage shallow, visible light communications can be performed at higher speed.

On the other hand, an amplifier circuit for amplifying a modulation signal treated by PWM is provided on the first driving circuit for applying a transmission signal to both ends of the resistor of the second driving circuit. However, electric current flowing to a white light emitting diode will not directly flow to a semiconductor element such as an FET used in the amplifier circuit. Therefore, a low-output element capable of operating at high speed may be used as a semiconductor element of the first driving circuit, thereby constituting at lower cost a driving circuit of a light emitting diode capable of operating at high speed.

Further, since only an extremely simplified circuit such as a resistor and an impedance matching element may be fixed to a lamp fitting of the white light emitting diode, it is possible to downsize the lamp fitting to a greater extent. Still further, the first driving circuit may be downsized by using a low-output element capable of operating at high speed, and the first driving circuit may also be installed in any place apart from the lamp fitting.

Further, since white light containing a blue light component is used as visible light, it is possible to use a blue light photodiode which is high in sensitivity and responsiveness as a light receiving element of a receiver, when compared with yellow light and white light photodiodes. Still further, a white light emitting diode which sheds blue light of the blue light emitting diode operating at high speed on a yellow fluorescent body to project white light can be used in a light projecting element. Thereby, PWM conducted by using high frequency signals from several hundred kilohertz to several megahertz can be adopted in visible light communications.

In this instance, the receiving circuit of the above-described receiver can be constituted in such a manner that after amplification of a light receiving signal, the waveform is shaped to give a rectangular wave signal, and the rectangular wave signal is allowed to pass through a low-pass filter, thereby outputting an analog receiving information signal.

According to the present invention, the necessity for installing a complicated demodulator circuit or detection circuit on the side of the receiver is eliminated, a circuit on the side of the receiver is greatly simplified and streamlined in constitution, thus making it possible to realize a one-chip receiver. It is also possible to reduce greatly the production cost of a visible light communication apparatus.

As described above, according to the visible light communication apparatus of the present invention, white light containing a blue light component is radiated as visible illumination light from a lamp fitting, and a blue light photodiode for receiving blue light at the highest sensitivity is used to receive the white light, thus making it possible to receive the blue light component contained in the white light at high sensitivity and also receive it so as to respond at high speed. Therefore, the lamp fitting is able to perform visible light communications at high speed by using a blue light component contained in white light, while functioning as an ordinary illumination fitting by irradiating the white light, thus making it possible to transmit and receive favorably digital audio signals and image signals great in the amount of information. Further, according to the visible light communication apparatus, the circuit can be easily constituted together with the transmitter and the receiver. In particular, only the second driving circuit simplified in structure may be contained near a projecting element inside the lamp fitting of the transmitter, and the first driving circuit including an amplifier circuit and the like may be installed in a place apart from the lamp fitting. Therefore, it is possible to downsize the lamp fitting and also simplify and streamline the receiving circuit of the receiver.

DESCRIPTION OF THE PREFERRED EMBODIMENTS

Figure 1:
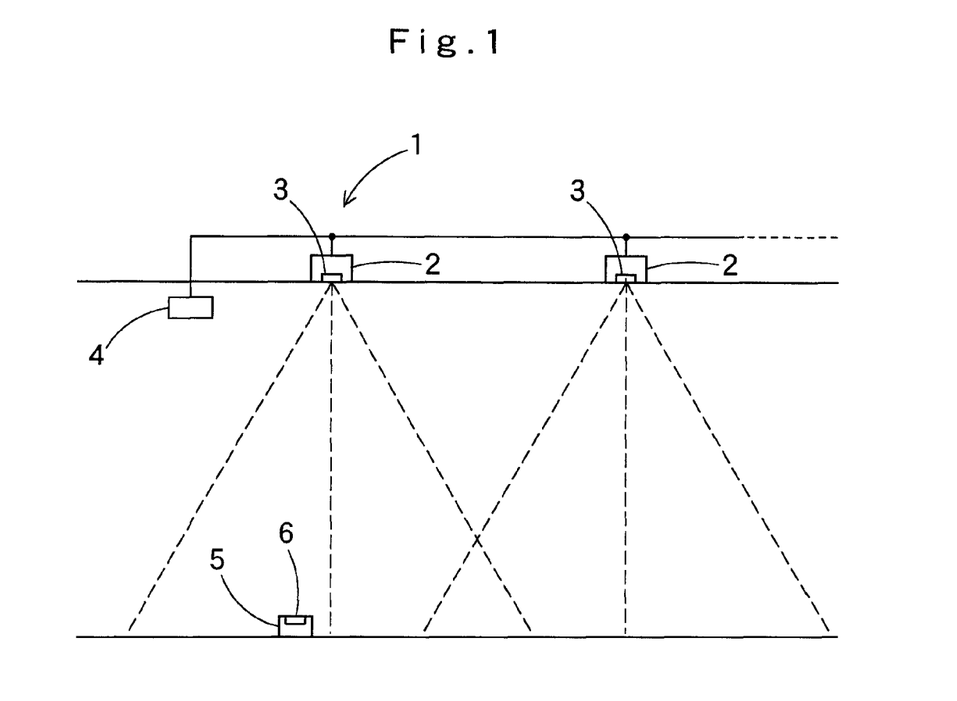
FIG. 1 is a schematic constitutional view showing a visible light communication apparatus which is an embodiment of the present invention.
Figure 2:
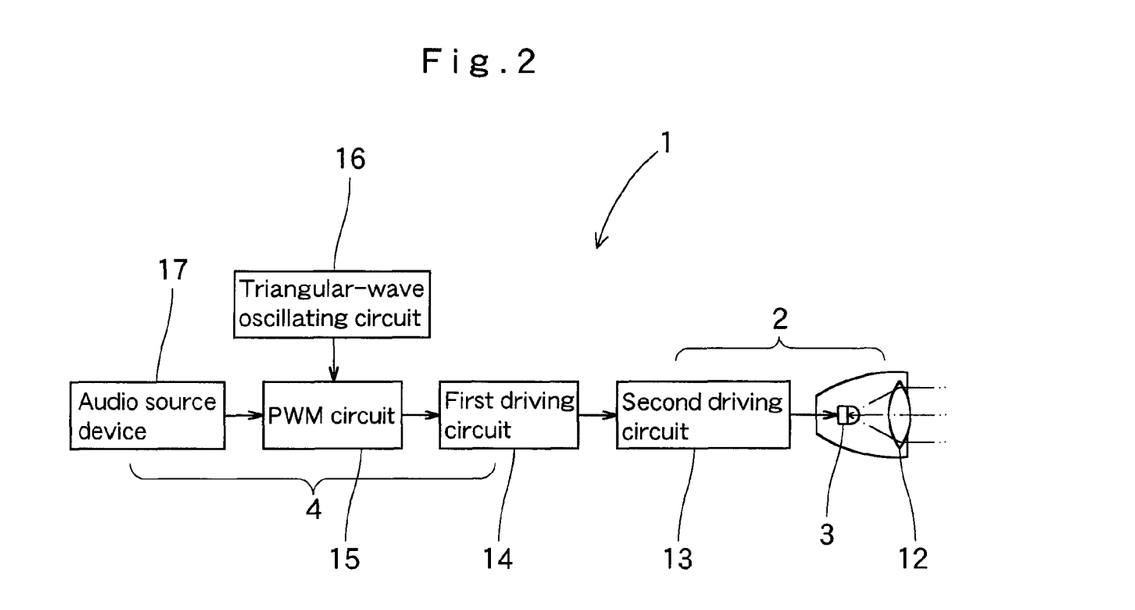
FIG. 2 is a block diagram of a transmitter.
Figure 6:
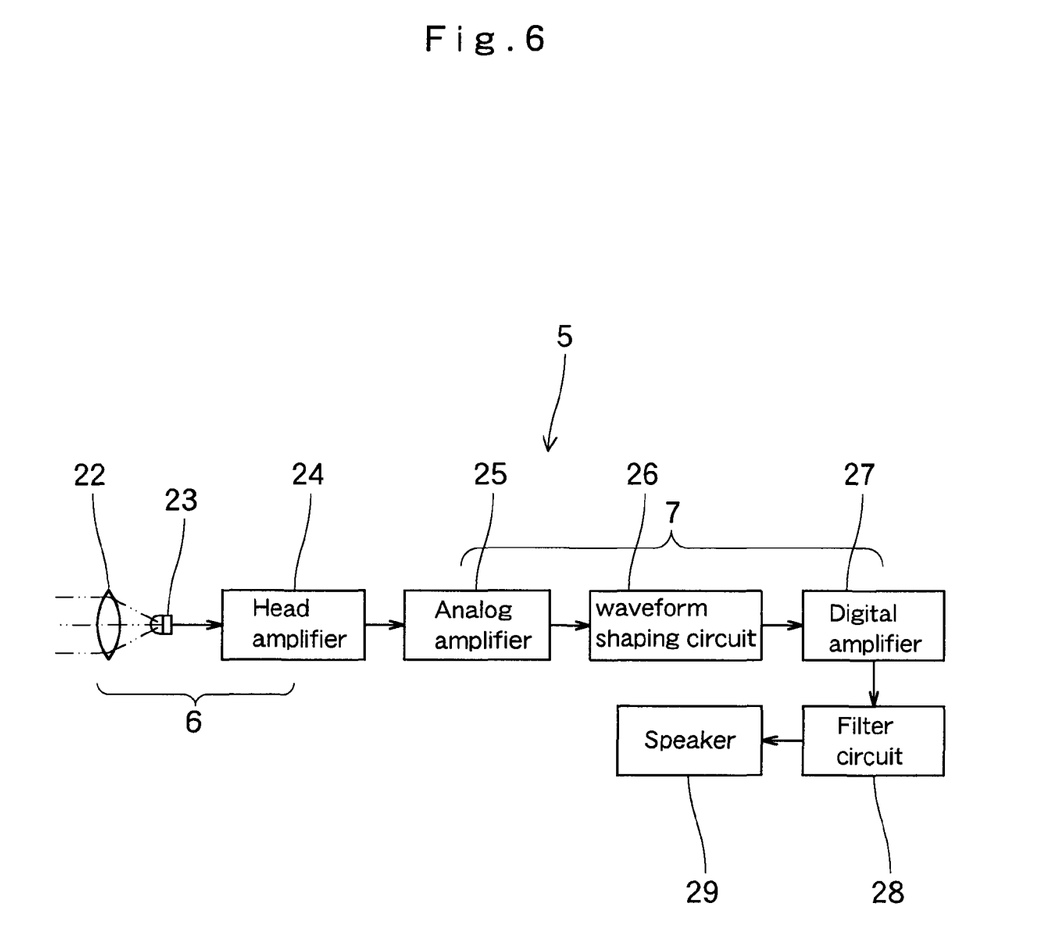
FIG. 6 is a block diagram of a receiver.

Hereinafter, a description will be given to an embodiment of the present invention with reference to the drawings. In addition, the present invention shall not be limited to the embodiment. Any modification within requirements of the claims or equivalents of the requirements shall be included within the scope of the claims. FIG. 1 is a schematic constitutional view showing a visible light communication apparatus, FIG. 2 is a block diagram of a transmitter 1 thereof, and FIG. 6 is a block diagram of a receiver 5 thereof. The visible light communication apparatus is used, for example, in an underground shopping center or the like, and the transmitter 1 illuminates stores and pathways at an underground shopping center by means of a lamp fitting 2, while superimposing various types of information signals such as audio guidance on visible light (white light) of the lamp fitting 2 to transmit them. The receiver 5 is installed in any place such as pathways and stores in an underground shopping center or carried by a user for use. The receiver 5 is constituted in such a manner so as to receive visible light illuminated and projected from the lamp fitting 2 of the transmitter 1, taking out and outputting information signals such as audio guidance which are superimposed on the visible light and transmitted.

As shown in FIG. 2, the transmitter 1 is provided with an audio source device 17 for outputting analog audio signals such as audio guidance, a lamp fitting 2 having a light projecting element 3 of a white light emitting diode for illuminating and projecting white light containing a blue light component to illuminate and project visible light (white light), a PWM circuit 15 for inputting the analog audio signals output from the audio source device 17 and treating the analog audio signals by PWM to generate an audio transmission signal, and a first driving circuit 14 and a second driving circuit 13 for driving the light projecting element 3 so as to superimpose the audio transmission signal on visible light, in which the second driving circuit 13 is contained inside the lamp fitting 2 to illuminate and project white light from the light projecting element 3 of the lamp fitting 2, thereby superimposing the audio signal on visible light for transmission.

The audio source device 17 is a device for outputting audio signals such as audio guidance, including, for example, an audio reproducing device for reading and reproducing digital audio signals recorded in recording media such as an MD, a CD, a semiconductor memory and a hard disk to output them as analog audio signals, a device for converting audio signals transmitted through a network to analog audio signals and outputting them, and a device for outputting human voices through a microphone as audio signals. As shown in FIG. 2, the output side of the audio source device 17 is connected to the input side of the PWM circuit 15 and a triangular-wave oscillating circuit 16 is also connected to the triangular-wave input side of the PWM circuit 15.

The triangular-wave oscillating circuit 16 is a circuit for oscillating and outputting a triangular-wave carrying signal of high frequency, for example, approximately 5 MHz, and the PWM circuit 15 takes the triangular-wave carrying signal from the triangular-wave oscillating circuit 16 and also takes an analog audio signal from the audio source device 17. Then, these signals are input respectively into the inverting input side of a comparator and the non-inverting input side thereof, and a PWM signal for switching these signals from the comparator depending on the magnitude relationship between them is output to conduct PWM.

Figure 5:
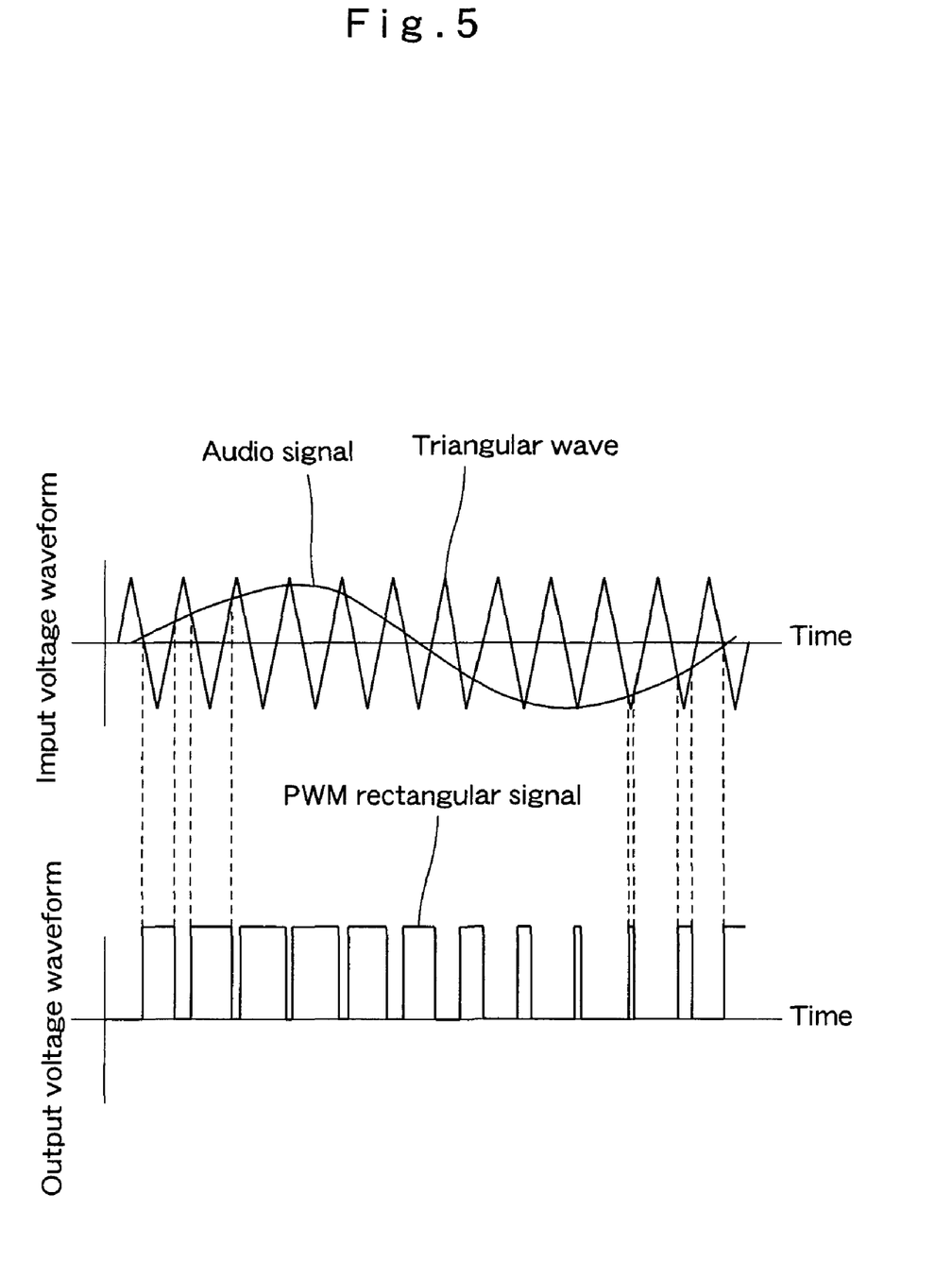
FIG. 5 is a diagram for explaining the waveform obtained when triangular waves and audio signals are used to conduct PWM.

Due to the above-described PWM, a pulse-shape PWM rectangular signal having a pulse width depending on a level of the analog audio signal is output to the first driving circuit 14 from the PWM circuit 15, as shown in FIG. 5. The first driving circuit 14 is connected to the output side of the PWM circuit 15 as shown in FIG. 2, and the output side of the first driving circuit 14 is connected to the second driving circuit 13 inside the lamp fitting 2. The lamp fitting 2 which is fixed, for example, at ceiling parts of a store and a pathway is that in which a single or a plurality of light projecting elements 3 are arranged inside a reflector 12 formed in a recessed shape to illuminate and project white illumination light. Only the light projecting element 3 and the second driving circuit 13 are contained inside the lamp fitting 2, the first driving circuit 14 is contained inside a transmitter main circuit 4 which includes the PWM circuit 15, the triangular-wave oscillating circuit 16 and the audio source device 17, and the transmitter main circuit 4 is installed in a place away from the lamp fitting 2. Thereby, it is possible to downsize the lamp fitting 2.

A white light emitting diode which illuminates and projects white light is used as the light projecting element 3 of the lamp fitting. The white light emitting diode acts so that the blue light of a blue light emitting diode having a high-speed responsiveness is shed on a yellow fluorescent body, thereby projecting white light by using the blue light and yellow light. In other words, the white light emitting diode used in the light projecting element 3 is a so-called pseudo white light emitting diode using a blue light emitting diode, for example, a light emitting diode structured so that a light emitting part of the blue light emitting diode prepared by doping GaN to a semiconductor is covered with a red-green fluorescent body such as a YAG-based fluorescent body. In the white light emitting diode, blue light from the blue light emitting diode excites the red-green fluorescent body to emit yellow light, by which the blue light passed through the fluorescent body is mixed with yellow light, or two light colors which are complementary to each other are mixed to generate white light.

Figure 4:
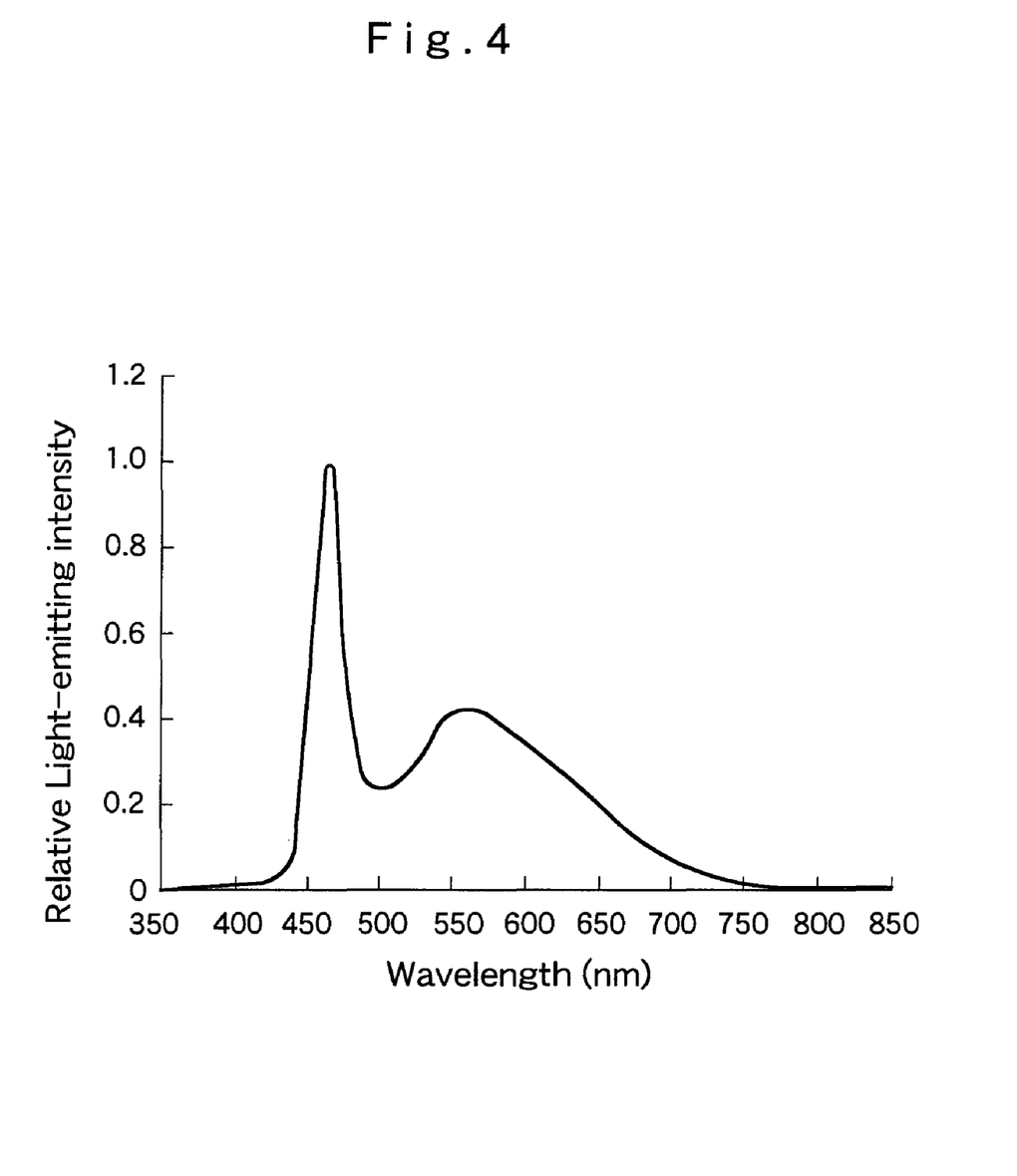
FIG. 4 is a spectrum diagram showing the wavelength and intensity of white light.

FIG. 4 shows an emission spectrum of the white light emitting diode, that is, the light projecting element 3 fixed on the lamp fitting 2 of the transmitter 1. As shown in FIG. 4, the emission spectrum of the light projecting element 3 has a very high peak value at approximately a 460 nm wavelength, which is a blue light component, and also has a smooth peak at approximately a 540 nm to 580 nm wavelength, which is a yellow light emitting part, thereby giving light which is perceived by humans as blue-like white light as a whole.

As described above, the transmitter 1 uses an audio signal output from the audio source device 17 to treat a high-frequency triangular-wave signal (carrier signal) oscillated by the triangular-wave oscillating circuit 16 by PWM, amplifying the thus modulated wave signal to project and drive the light projecting element 3. As described above, when a modulated wave signal containing a high frequency carrier signal, which is extremely high, for example, approximately 5 MHz, is used to drive a light projecting element 3 of the white light emitting diode, white light containing a blue light component is radiated therefrom, and as shown in FIG. 4, an emission spectrum of the light projecting element 3 exhibits a very high peak value at approximately a 460 nm wavelength, which is the blue light component, thereby giving an emission spectrum in which the blue light component is contained.

Figure 3:
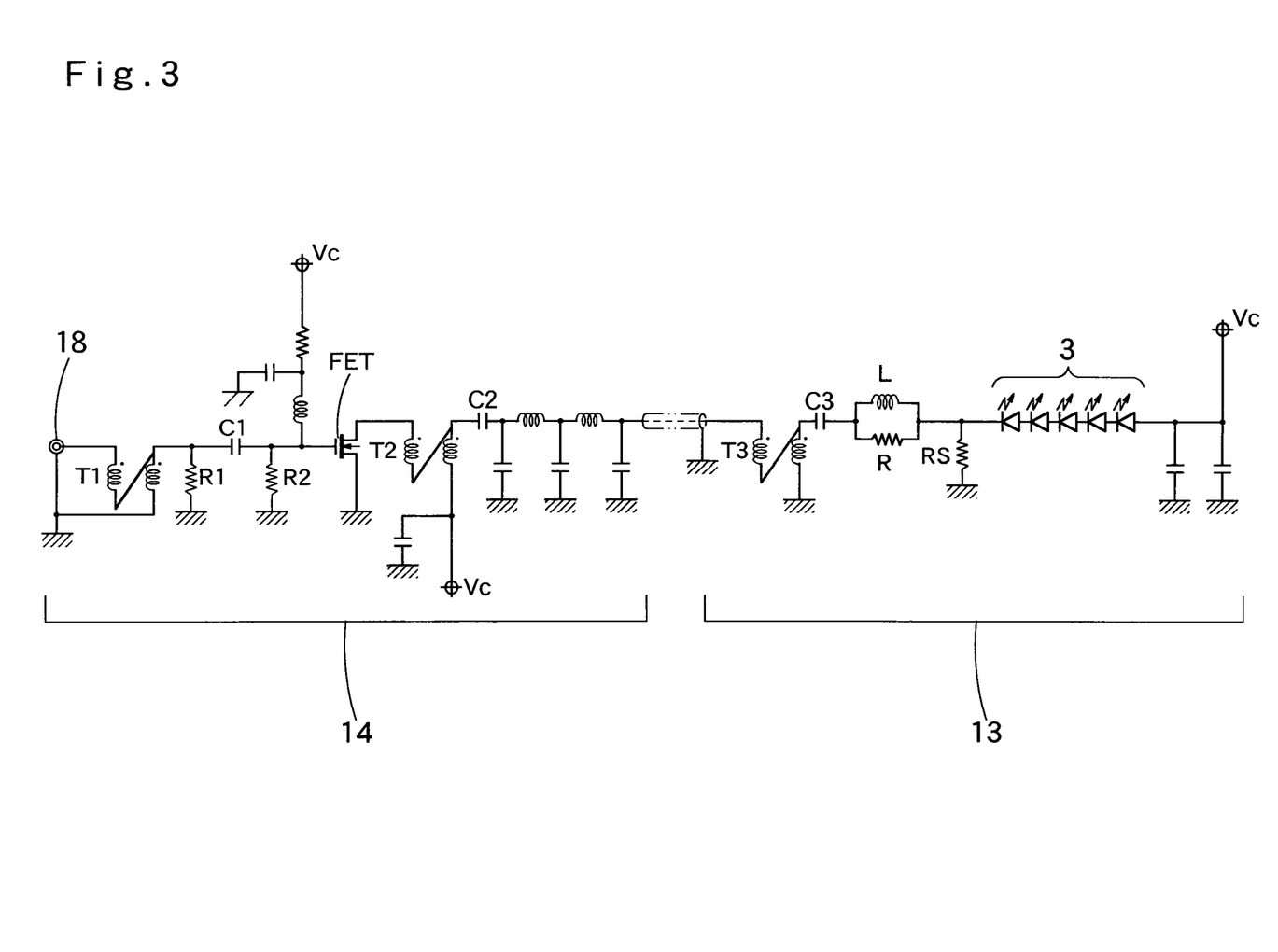
FIG. 3 is a circuit diagram of a driving circuit of a light projecting element in the transmitter.

As shown in FIG. 3, a driving circuit of the light projecting element 3 in the transmitter 1 is constituted with the first driving circuit 14 and the second driving circuit 13. The first driving circuit 14 is provided with an amplifier circuit of an FET for amplifying a modulation signal treated by PWM from an input unit 18, by which a subtle PWM signal is input from the input unit 18 to amplify the modulation signal and output it into the second driving circuit 13. The FET used in the first driving circuit 14 has only a function to amplify a digital high-frequency signal and therefore direct current flowing directly to the light projecting element 3 of the lamp fitting 2 will not flow into the FET. Therefore, low-power FETs can be used. Then, it is possible to use low-power FETs lower in price, wider in selection range and preferable in high frequency characteristics.

In the first driving circuit 14 of FIG. 3, a transformer T1 for impedance matching and dummy loads of an FET R1, R2 are connected between the input unit 18 and a gate of the FET, together with a condenser C1, and a constant-voltage circuit for applying a bias voltage of the FET is connected to the gate. Further, a transformer T2 for impedance matching and a π-type matching circuit for impedance matching are connected to the output side of a circuit on a drain of the FET. The output side of the first driving circuit 14 is connected to the second driving circuit 13. However, as described above, it is not necessary to arrange the first driving circuit 14 and the second driving circuit 13 physically in close proximity. For example, the second driving circuit 13 is contained inside the lamp fitting 2, the first driving circuit 14 is, as shown in FIG.

1, contained inside a separately-arranged transmitter main circuit 4, and these distant driving circuits may be connected by means of a coaxial cable.

As shown in FIG. 3, the second driving circuit 13 is constituted in such a manner that a constant voltage power source is connected to the anode of the light projecting element 3 (white light emitting diode) of the lamp fitting 2, a resistor RS is connected between the cathode of the light projecting element 8 and the ground, and a transmission information signal (modulation signal treated by PWM) transmitted from the first driving circuit 14 is applied to both ends of the resistor RS. The cathode of the light projecting element 3 is connected to the input unit of the second driving circuit 13, that is, the output side of the first driving circuit 14 by way of a reactor circuit LR for offsetting floating capacitance, a condenser C3 for cutting a direct-current component, and a transformer T3 for impedance matching.

When being input into the input unit 18 of the first driving circuit 14, an alternate-current rectangular signal (digital information signal) treated by PWM is amplified by an FET, then applied to both ends of the resistor RS on the second driving circuit 13 and transmitted after a transmission information signal (a modulated wave signal obtained by treating a triangular-wave signal by PWM with an audio signal) is superimposed on white light projected from the light projecting element 3.

The receiver 5 is provided with a light receiving unit 6 for receiving visible light illuminated and projected from the lamp fitting 2 of the transmitter 1 to receive an information signal contained in the light receiving signal. Then, the light receiving unit 6 receives the visible light to effect photoelectric conversion and uses a light receiving element 23 for outputting a light receiving signal and a collecting lens 22 arranged on the front face of the light receiving element 23, thereby collecting the visible light made incident from forward and shedding the light on the light receiving element 23.

A blue light photodiode is used as the light receiving element 23. The blue light photodiode is a photodiode which receives blue visible light at the highest sensitivity to effect photoelectric conversion at a high conversion rate and also outputs a light receiving signal at a high responsiveness. In addition, blue light includes blue laser light in addition to ordinary blue light and the light receiving element 23 may also include a photodiode for blue laser light which is used in monitoring laser light of a DVD and R/RW/-RAM, for example. Further, the blue light includes not only pure blue light but also blue-purple light. A blue light photodiode in which the element has a peak light-receiving sensitivity of 405 nm (blue-purple light wavelength) or a peak light-receiving sensitivity of 460 nm (blue light wavelength) may be used.

The above-described blue light photodiode is formed, for example, by providing a light receiving part with a diameter of approximately 0.6 mm on a package of 2.8 mm long, 1.4 mm wide and 1.1 mm high. Although, in general, a light receiving part on an ordinary white light photodiode is approximately 0.2 mm in diameter, the light receiving part of this blue light photodiode is approximately three times greater. Therefore, the blue light photodiode is provided with a light receiving part which is much greater in diameter than that of an ordinary white light photodiode. The blue light photodiode is higher in light receiving sensitivity of 0.28 A/W (at the time of 405 nm wavelength) due to the fact that the light receiving part thereof is greater in diameter. Further, the blue light photodiode is provided with the light receiving part greater in diameter and also quite high in responsiveness, for example, approximately 400 MHz when a reverse bias voltage is 2V.

As described above, where the blue light photodiode is used which has the light receiving part, the diameter of which is approximately 0.6 mm greater than the light receiving part of an ordinary white light photodiode, there is no need for focusing subtle light collected from the collecting lens 22 on the light receiving unit 6 at the light receiving part, thus making it possible to receive at high sensitivity light which is deviated to some extent from a focal position. Thereby, it is possible to avoid an excessive heat concentration at the light receiving part of the photodiode in a focal position. Further, the depth of field is made deeper, by which the light receiving unit 6 can be kept favorably for the light receiving state so as not to be substantially affected by a distance or a position from the lamp fitting 2.

Conventionally, light receiving elements such as photo resistors generally used for receiving red or yellow visible light and infrared light are lower in sensitivity and speed of response than the light receiving element 23 using a blue light photodiode including a blue laser photodiode. Therefore, unlike the present invention, it is impossible to receive visible light on which a modulated signal output by treating, for example, a carrier signal having a high frequency of 5 MHz by PWM with an audio signal or the like is superimposed and also take out an information signal higher in fidelity and excellent in sound and image qualities. However, a blue light photodiode is used as the light receiving element 23, thus making it possible to receive visible light treated by PWM at the high frequency and also take out an information signal higher in fidelity.

As shown in FIG. 6, in the light receiving unit 6, a head amplifier 24 is connected to the light receiving element 23 and a light receiving signal output from the light receiving element 23 is first amplified by the head amplifier 24 and then output. An analog amplifier 25 is connected to the output side of the head amplifier 24, and an input signal is amplified as it is in an analog manner. The output side of the analog amplifier 25 is connected to a waveform shaping circuit 26 using a comparator, and the waveform shaping circuit 26 eliminates a direct-current component from the light receiving signal to shape the waveform.

The light receiving signal, which is fundamentally an alternate-current rectangular signal treated by PWM, is amplified by the analog amplifier 25 to result in super imposition of a direct-current component. Therefore, the signal is allowed to pass through the waveform shaping circuit 26 and output as a waveform-shaped rectangular wave signal, with the direct-current component being eliminated. A digital amplifier 27 is connected to the output side of the waveform shaping circuit 26, and the rectangular wave signal output from the waveform shaping circuit 26 is transmitted to the digital amplifier 27 and amplified as a digital signal.

As shown in FIG. 6, a filter circuit 28 is connected to the output side of the digital amplifier 27. The filter circuit 28 is constituted with a lowpass filter using a coil and a condenser, converting an alternate-current rectangular wave signal treated by PWM to a smooth analog signal, returning the received signal to an analog audio signal before the treatment by PWM, thereby outputting the analog audio signal. The output side of the filter circuit 28 is connected to a speaker 29, and the speaker 29 is driven to output sounds such as audio guidance transmitted from the transmitter 1.

As described so far, white light containing a blue light component is used as visible light on which an information signal, that is, a modulated signal, is superimposed for illumination and projection, and a blue light photodiode high in sensitivity and responsiveness is used in the light receiving element 23. Thereby, a blue light emitting diode capable of conducting switching operation at high speed can be used in the light projecting element 3 of the transmitter 1, and PWM can be adopted in visible light communications in which a carrier signal having a high frequency of several megahertz is modulated with an audio signal or the like.

Therefore, conventionally, for example, in a case of transmission of audio signals in wireless communications, no complicated demodulator circuit or detection circuit is needed on the side of a receiver, as compared with generally adopted FM modulation or FSK modulation. Therefore, it is possible to keep the quality of sounds output from the receiver in good condition and also greatly simplify and streamline an electric circuit on the receiver.

Next, a description will be given of operation of the above-constituted visible light communication apparatus. As shown in FIG. 1, the transmitter 1 of the visible light communication apparatus is arranged, with the lamp fitting 2 fixed, for example, at ceiling parts of a store, a pathway or a window in an underground shopping center. The transmitter main circuit 4 containing the audio source device 17, the PWM circuit 15 and the like can be installed in a distant place such as a wall. The receiver 5 is installed in any place such as a store, a pathway and inside a window which can receive visible light (white light) illuminated and projected from the lamp fitting 2 or can be carried by a user.

Audio information such as public relations on products, explanations of products and audio guidance on emergencies is accommodated inside the audio source device 17 of the transmitter 1, and the audio information is read out at any given timing and output into the PWM circuit 15 as an analog audio signal. In the PWM circuit 15, as shown in FIG. 5, a pulse-shaped PWM rectangular signal having a pulse width depending on a level of analog audio signal is formed from a triangular-wave carrier signal and an analog audio signal transmitted from the triangular-wave oscillating circuit 16, and the analog audio signal is treated by PWM.

The pulse-shaped PWM signal (modulated wave signal) output from the PWM circuit 15 to the first driving circuit 14 is amplified by an FET and thereafter transmitted to the second driving circuit 13 inside the lamp fitting 2, and the PWM signal, which is a transmission information signal, is applied to both ends of a resistor RS inside the second driving circuit 13. At the second driving circuit 13, driving current is supplied to the light projecting element 3 of the lamp fitting 2 from a constant voltage power source, flowing from the cathode of the light projecting element 3 to the resistor RS, thereby driving the light projecting element 3. In this instance, as shown in FIG. 5, since the pulse-width modulated transmission information signal is applied to both ends of the resistor RS of the second driving circuit 13, the transmission information signal is superimposed on visible light (white light) illuminated and projected from the light projecting element 3 and then transmitted.

The visible light illuminated and projected from the light projecting element 3 of the lamp fitting 2 on which the transmission information signal is superimposed is used for illumination as white light and the light is received by the light receiving unit 6 on the receiver 5 installed in a range covered by the illumination light thereof. Upon receiving the visible light illuminated and projected from the lamp fitting 2 of the transmitter 1, the light receiving element 23 of the light receiving unit 6 amplifies a light receiving signal by the head amplifier 24 to output the light receiving signal which is further amplified by the analog amplifier 25. A direct current component is eliminated from the thus amplified signal by the waveform shaping circuit 26, and the amplified signal is subjected to waveform shaping.

The thus waveform shaped rectangular signal is transmitted to a digital amplifier 27 and amplified as a digital signal. Thereafter, a receiving information signal, which is a rectangular wave signal, is sent to a filter circuit 28. At the filter circuit 28, a lowpass filter using a coil and a condenser is used to convert an alternate-current rectangular signal treated by PWM to a smooth analog signal, and the analog audio signal is output into a speaker 29. Sounds such as information on public relations of product, explanations of products and audio guidance on emergencies which are transmitted from the transmitter 1 are generated from the speaker 29.

As described above, in the transmitter 1, since the light projecting element 3 which is operable at high speed to illuminate and project white light containing a blue light component is used, a PWM signal treated by PWM is applied as it is as a transmission information signal to the resistor RS of the second driving circuit 13 and can be superimposed on visible illumination light. Thereby, it is possible to simplify and streamline a circuit constitution of the transmitter 1 to a greater extent than a conventional circuit constitution.

Further, a blue light photodiode higher in sensitivity and responsiveness at as high a level as several hundred megahertz is used as a light receiving element in the receiver 5, thus making it possible to secure a transmission channel over a wide range. Where a PWM signal obtained by treating, for example, a carrier signal having a very high frequency of 5 MHz by PWM with an audio signal or the like is superimposed on visible light, it is necessary to minimize the amount of delay of a group delay up to high frequency wave of approximately a 40th order. However, a blue light photodiode higher in sensitivity and responsiveness at as high as several hundred megahertz can be used to secure a transmission channel over a wide range of 200 MHz, which is a range of approximately a 40th order. Thereby, the necessity for a demodulator circuit or a tuning circuit which has been needed by a conventional receiving circuit for receiving a PWM signal is eliminated, thus making it possible to simplify and streamline a circuit constitution of the receiver 5 to a great extent and also realize the receiver 5 in a one chip formation.

In the above embodiment, a description was given to a transmission information signal to be transmitted by referring to an audio signal, but in addition to the audio signal, various types of information signals such as an image signal and a data signal can be transmitted and received.

What is claimed is:

1. A visible light communication apparatus comprising: a transmitter for illuminating and projecting visible light on which an information signal is superimposed; and
   a receiver for receiving the visible light illuminated and projected from the transmitter to take out the information signal superimposed on the visible light; wherein
   the transmitter is provided with a transmitter main circuit including a modulation circuit for modulating a signal to generate a transmission information signal, and
   a lamp fitting for driving a light projecting element to superimpose the transmission information signal on the visible light, thereby radiating white light containing a blue light component as visible illumination light,
   the receiver is provided with a light receiving unit for receiving the white light containing the blue light component radiated from the lamp fitting of the transmitter, and a receiving circuit for generating a receiving information signal from a light receiving signal output from the light receiving unit, a pseudo white light emitting diode having a structure that a light emitting part of the blue light emitting diode is covered with a red-green fluorescent body and generating white light by a mixture of two light colors, the blue light and yellow light, which are complimentary to each other, and are used in the projecting element of said lamp fitting, and a blue light photodiode for receiving blue light at the highest sensitivity to output the light receiving signal is used as a light receiving element of the light receiving unit.

2. The visible light communication apparatus according to claim 1, wherein, the lamp fitting of the transmitter is provided with a projecting element of said pseudo white light emitting diode, a second driving circuit for connecting a resistor between a cathode of the pseudo white light emitting diode and the ground so as to flow a power electric current of the pseudo white light emitting diode directly to the resistor, thereby driving the pseudo white light emitting diode, and the transmitter main circuit of said transmitter is provided with the circuit by pulse-width-modulation for treating a signal by pulse-width modulation to generate transmittal information signal, and a first driving circuit having an amplifier circuit for amplifying a transmittal information signal treated by pulse-width-modulation and connected to the input side off the second driving circuit, and a transmission signal output from the first driving circuit is applied to both ends of the resistor of the second driving circuit.

3. The visible light communication apparatus according to claim 2, wherein the second driving circuit is provided with a transformer for impedance matching, a condenser for cutting a direct-current component, and a reactor circuit for offsetting floating capacitance, wherein the transmission signal output from the first driving circuit is applied to both ends of the resistor of the second driving circuit through the transformer for impedance matching, the condenser for cutting a direct-current component, and the reactor circuit for offsetting floating capacitance.

4. The visible light communication apparatus according to claim 2, wherein said transmitter main circuit is provided with a triangular-wave oscillating circuit output wherein the triangular-wave signal is the carrier signal, the audio source device outputs analog audio signals, and pulse-width-modulation circuit outputs the transmittal information signal treated by pulse-width modulating the analog audio signal inputting the analog audio signal and also taking the triangular-wave signal.

5. The visible light communication apparatus according to claim 3, wherein the transmitter main circuit is installed in a place away from the lamp fitting, and a space between the second driving circuit of the lamp fitting and the first driving circuit of the transmitter main circuit is connected by means of a coaxial cable.

6. The visible light communication apparatus according to claim 1, wherein a receiving circuit of the above receiver amplifies a light receiving signal, thereafter shaping the waveform to give a rectangular wave signal, allowing the rectangular wave signal to pass through a lowpass filter, thereby outputting an analog receiving information signal.

* * * * *